United States Patent Office 3,562,269
Patented Feb. 9, 1971

3,562,269
TRIS(m- OR p-AZIDOSULFONYL-PHENYL)-
ISOCYANURATES
Henri Ulrich, Northford, Conn., assignor to The Upjohn Company, Kalamazoo, Mich., a corporation of Delaware
No Drawing. Filed Mar. 10, 1969, Ser. No. 805,824
Int. Cl. C07d 55/14
U.S. Cl. 260—248
3 Claims

ABSTRACT OF THE DISCLOSURE

This invention is of a novel group of tris(m- or p-azidosulfonylphenyl)-isocyanurates optionally having halo and/or alkyl substituents in the phenyl ring, one of the positions ortho in respect to azidosulfonyl being unsubstituted. Compounds of the invention are useful as blowing agents in high polymers, and as cross-linkers in photoresist systems and elastomers.

BACKGROUND OF THE INVENTION (1) Field of the invention

This invention relates to novel isocyanurates and is more particularly concerned with novel tris(azidosulfonylarene)isocyanurates and with methods for their preparation and with their uses as cross-linking and blowing agents.

SUMMARY OF THE INVENTION

The invention comprises a novel group of compounds with the structural formula:

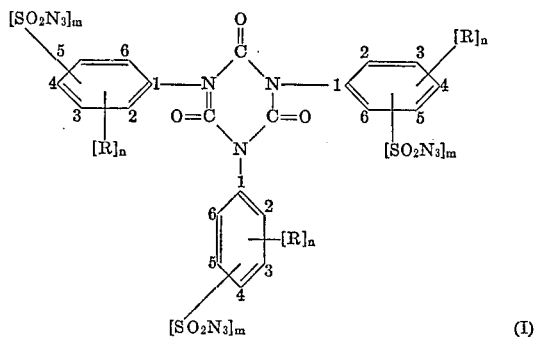

wherein R is a member selected from the group consisting of lower-alkyl and halogen; $m$ is an integer of 1 to 2, $n$ is an integer of 0 to 2 and is such that the sum of $m$ and $n$ does not exceed 3; [$SO_2N_3$] is attached in positions 3, 4 and 5; and [R] is attached at any unsubstituted position, provided that at least one of positions 3, 4 and 5 is unsubstituted.

The term "lower-alkyl" means alkyl of from 1 to 6 carbons inclusive such as methyl, ethyl, propyl, butyl, pentyl, hexyl and isomeric forms thereof. The term "halogen" is employed in its generally accepted sense as embracing fluorine, chlorine, bromine, and iodine.

The compounds of the invention are photolytic and thermolytic, and useful as blowing agents and as cross-linkers, particularly in, but not limited to, photo-resist systems.

DETAILED DESCRIPTION OF THE INVENTION

The compounds of the invention of Formula I are prepared by reacting the corresponding isocyanatoarenesulfonyl chloride having the formula:

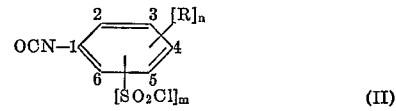

wherein R, $n$ and $m$ have the significance hereinbefore defined; with sodium azide. The reactants are brought together slowly, preferably dropwise, to control the reaction which is exothermic. External cooling and constant stirring assist in controlling the reaction which proceeds advantageously in a temperature range of 20° C. to 80° C. The reaction is preferably carried out in a polar solvent such as acetonitrile, N,N-dimethylformamide, hexamethylphosphoramide, and the like. Cessation of sodium chloride precipitation indicates completion of the reaction.

The use of substantially stoichiometric quantities of reactants provides high yields of the compounds of Formula I, which, upon filtration of the reacted mixture, are found in the filtrate. The compounds of Formula I are obtained from the filtrate by conventional procedures, for example, by evaporating the solvent or by addition of water, which will precipitate the water insoluble compounds of Formula I.

The reaction is represented by the following equation:

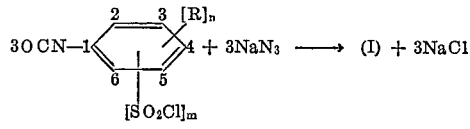

where $m$, $n$ and R have the significance hereinfore defined.

The starting compounds of Formula II are prepared by phosgenation of the corresponding amino benzene sulfonic acids. Representative of the phosgenation procedures employed is that described by L. Alberino et al., Journal of Polymer Science, Pt. A–1, vol. 5 (1967), pp. 3212–13.

The starting aminobenzenesulfonic acids required to prepare the compounds of Formula II are, for the most part known in the art, and can be prepared by methods well-known in the art. Illustratively, 4-aminotoluenesulfonic acid and 2-chloro-sulfanilic acid are prepared by sulfonation of m-toluidine and m-chloroaniline, respectively [Veno and Tominaga, Bull. Tokyo Univ. Eng., 12; No. 1, pp. 57–60 (1943)]. 4-amino - 2,5-xylenesulfonic acid is a well-known compound, preparation of which was described as early as 1931 [Hunter and Sprung, J. Am. Chem. Soc. 53, 1432–43 (1931)]. A method for preparing 2,5-dichlor-4-aminobenzenesulfonic acid is described by Petitcolas and Sureau, Bull. Soc. Chem. France (1954) pp. 986–90. 5-amino-benzene-1,3-disulfonic acid can be prepared using methods well-known in the art such as reduction of 5-nitrobenzene-1,3-disulfonic acid. A method of preparing 5-nitrobenzene-1,3-disulfonic acid is described in Beilstein Handbuch Der Organischen Chemie, fourth edition (1928), vol. II, p. 202.

As set forth above, the compounds of the invention of Formula I are useful as cross-linking agents. Methods of using polyazides and polysulfonazides as cross-linkers have been described in a number of patents, including U.S. Pat. 3,058,957 (Breslow), U.S. Pat. 3,203,937 (Breslow et al.), and U.S. Pat. 3,261,786 (Breslow). Methods of using polysulfonylazides as cross-linkers in photo-resist systems are described in British Pat. 1,062,884 (Laridon et al.). In general, the method of using polysulfonylazides as cross-linkers in photo-resist systems is to prepare a solution of a mixture of 0.1% to 25% by weight of the cross-linker with a linear polymer such as a polyamide, a polyester and/or a polyester amide. The solution is applied to a supportive base. Typical supports are usually a metal, paper, glass, ceramic, plastic, polyvinyl acetate film, polystyrene film etc. material. Various additives may also be present in the solution such as dyes, solvents, sensitizers, and radiation absorbers. After drying the applied film, a photographic negative is placed between the film and a source of thermal or ultraviolet radiation. The film is then exposed to said thermal or ultraviolet radiation, which action results in cross-linking of the polymer thereby rendering the exposed portion insoluble in a wide range of solvents. The concentration of cross-linker and the quantity of exposure to thermal or photo radiation is directly proportional to the degree of cross-linking and amount of insoluble polymer obtained at the site of exposure. When washed with a suitable solvent, the unexposed portion of the film dissolves and is flushed away leaving the insoluble cross-linked polymer on the surface of the film support in the form of a positive image corresponding to the negative used in the radiation or heating step. This positive image is resistant to a wide range of solvents, acids, alkalies, water, abrasives, etc. and is therefore suited for use in reproduction processes such as lithography, photomechanical reproduction processes and production of printed microcircuitry.

The compounds of Formula I were found to have distinct advantages as photo-resist components when compared to prior known sulfonazide compounds. Their trifunctionality allows a higher degree of cross-linking than mono or difunctional cross-linkers, yielding polymers of particularly high molecular weight. The result is a positive image of improved resolution.

The compounds of Formula I are also capable of cross-linking polymeric dyes and polymer substrates. A distinct improvement is found in that the polymer substrate need not have functional groups for attachment of the cross-linker, e.g. OH, $NH_2$, COOH, for example, photo-resist systems based on reactive polymers, such as polyvinyl alcohol and maleic anhydride copolymers are well-known. Any polymer substrate, having carbon to hydrogen bonds, will be cross-linked using compounds of Formula I. Examples of such polymers would include, but not be limited to, polyolefins, polyethers, polyesters, polyamides, and polyurethanes. Furthermore, photo or heat bonding of polymeric films with superior physical properties (abrasion resistance, improved hardness etc.) onto basic polymer substrates can be affected using the compounds of Formula I as cross-linking agents.

The compounds of Formula I are also useful as blowing agents when added to polymers such as polyethylene, polypropylene, natural rubber, butadiene/acrylonitrile rubber, styrene/butadiene co-polymers, polyvinyl chloride and the like. The foam forming use of sulfonic azides has been described by Goldberg and Balabanou in ZH. Organ. Kim., 1(9), 1604–6 (1965) (Russ.). The technique is well-known to those skilled in the art, and in general is accomplished by first blending the blowing agent, in stoichiometric quantity, into the polymer material. This blending may be by milling on a conventional rubber mill or dissolving in a solution of the polymer. Other methods of mixing the compounds of Formula I with polymers will be apparent to one skilled in the art. Additives such as fillers, extenders, stabilizers, surfactants, dyes, plasticizers, etc. may also be added. The mixture is then heated, usually in a mold, to a temperature of 110° C. to 200° C., which results in the release of nitrogen. The period of time required for the reaction to occur is dependent on the temperature used, but generally occurs in 1–10 minutes. The compounds of Formula I are particularly efficient as blowing agents, releasing 3 moles of nitrogen for each mole of compound used.

It will also be apparent that the compounds of the invention can be used as a combination cross-linker and blowing agent when used in appropriate quantities under controlled conditions of thermal and/or ultraviolet radiation.

The following examples describe the manner and process of making and using the invention and set forth the best mode contemplated by the inventor of carrying out the invention but are not to be construed as limiting.

EXAMPLE 1

To 1.95 gm. (0.3 mole) of sodium azide in 50 ml. of acetonitrile is added 6.5 gm. (0.3 mole) 4-isocyanatobenzenesulfonyl chloride [prepared by a method described by Alberino et al. supra] in 30 ml. of acetonitrile. The addition is done dropwise over a period of 12 minutes with constant stirring of the mixture.

The temperature range during the addition is between 16° C. and 25° C. As the reaction progresses, sodium chloride precipitates from the solution, resulting in a cloudy mixture. When the addition of sulfonyl chloride is complete, the resulting mixture is filtered to remove the sodium chloride, and the filtrate evaporates, yielding 6.4 gm. (95.5%) theoretical yield of tris(p-azidosulfonylphenyl)isocyanurate in the form of white crystals which darken between 160° C. to 170° C., and have a melting point over 300° C. The compound shows the characteristic azide absorption at 2128 cm.$^{-1}$ and a carbonyl absorption at 1695 cm.$^{-1}$ in its infrared spectrum which is in agreement with the assigned structure.

*Analysis.*—Calcd. for ($C_{21}H_{12}N_{12}O_9S_3$ (percent): C, 37.50; H, 1.79. Found (percent): C, 37.55; H, 1.84.

The above reaction is represented by the following equation:

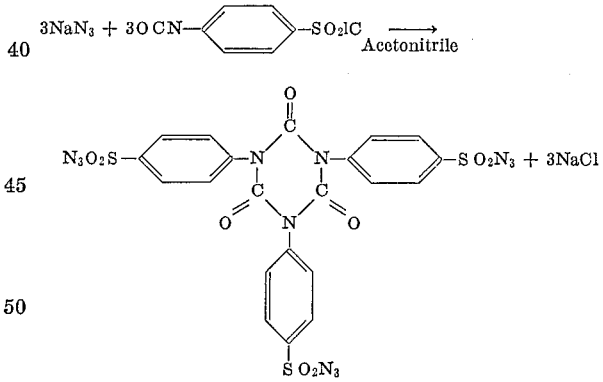

EXAMPLE 2

Using the procedure described in Example 1, but replacing the 4-isocyanatobenzenesulfonyl chloride by 3-isocyanatobenzenesulfonyl chloride there is obtained tris(m-azidosulfonylphenyl)isocyanurate.

Similarly, using the procedure described in Example 1, but replacing 4-isocyanatobenzenesulfonyl chloride by 2-chloro - 4 - isocyanatobenzenesulfonyl chloride, 4-isocyanato - 3-methylbenzenesulfonyl chloride, 2,5-dichloro-4-isocyanatobenzenesulfonyl chloride, or 5-isocyanatobenzene-1,3-di(sulfonyl chloride), there are obtained:

tris(3-chloro-4-azidosulfonylphenyl)isocyanurate,
tris(2-methyl-4-azidosulfonylphenyl)isocyanurate,
tris(2,5-dichloro-4-azidosulfonylphenyl)isocyanurate,
tris[3,5-di(azidosulfonyl)phenyl]isocyanurate, respectively.

The 2-chloro-, 3-methyl-, and 2,5-dichloro-4-isocyanatobenzenesulfonyl chlorides and the 5-isocyanatobenzene-1,3-di(sulfonyl chloride) employed in the above process are obtained by phosgenation of the corresponding known amino benzene sulfonic acids using the procedure of Alberino, supra.

EXAMPLE 3

This example illustrates the use as cross-linker of a typical compound of the invention.

50 mg. tris[p-azidosulfonylbenzene]isocyanurate and 250 mg. Gantrez AN-139 (co-polymer of methyl vinyl ether and maleic anhydride manufactured by General Aniline & Film Corp.) are dissolved in 5 ml. acetone. The mixture is applied with a whirler to a quartz plate; a clear film is thus obtained. A portion of the film is exposed to ultraviolet radiation from a medium pressure mercury lamp for 5 minutes at a distance of 30 cm. The film is then washed with acetone, dissolving away the unexposed portion and leaving an insoluble portion corresponding to the irradiated area. The portion insoluble in acetone is also insoluble in dimethylformamide (3 minutes immersion).

EXAMPLE 4

This example illustrates the photobonding of a polar polymer (Gantrez AN-139) to a nonpolar polymeric substrate (polyethylene) using a compound of Formula I as the chemical bonding agent.

Using the same procedure described in Example 3, a film is prepared upon a polyethylene substrate. The film is exposed to ultraviolet radiation from a medium pressure mercury lamp at a distance of 30 cm. for 5 minutes, with a negative image interposed between the film and the radiation source. After washing with acetone, an insoluble area remains, forming a positive image which corresponds with the negative used in the irradiation step. The positive image adheres strongly to the polyethylene substrate and requires abrasion to be removed. The exposed area of the film is insoluble in dimethylformamide (3 minutes immersion).

What is claimed is:
1. A compound having the formula:

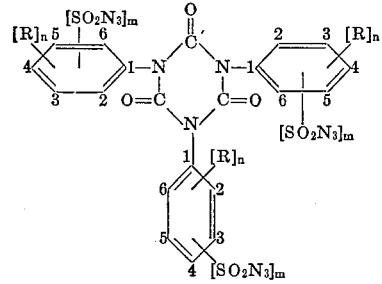

wherein R is a member selected from the group consisting of lower-alkyl and halogen; $m$ is an integer of 1 to 2, $n$ is an integer of 0 to 2 and is such that the sum of $m$ and $n$ does not exceed 3; [SO$_2$N$_3$] is attached in positions 3, 4 and 5; [R] is attached at any unsubstituted position, provided that at least one of positions 3, 4 and 5 is unsubstituted.

2. The compound of claim 1 wherein $n$ is 0, $m$ is 1 and [SO$_2$N$_3$] is located at position 3, said compound being tris[m-azidosulfonylbenzene]isocyanurate.

3. The compound of claim 1 wherein $n$ is 0, $m$ is 1 and [SO$_2$N$_3$] is located at position 4, said compound being tris[p-azidosulfonylbenzene]isocyanurate.

References Cited

UNITED STATES PATENTS 3,144,452   8/1964   Wild et al. _____ 260—248

JOHN M. FORD, Primary Examiner

U.S. Cl. X.R.

96—88; 117—34; 260—2.5, 79.3